United States Patent [19]
Haslund

[11] Patent Number: 5,525,364
[45] Date of Patent: Jun. 11, 1996

[54] METHOD AND AN APPARATUS FOR TEMPERING CHOCOLATE-LIKE MASSES

[75] Inventor: Henning Haslund, Ballerup, Denmark

[73] Assignee: Aasted-Mikroverk ApS, Denmark

[21] Appl. No.: 340,882

[22] Filed: Nov. 15, 1994

[30] Foreign Application Priority Data

Nov. 23, 1993 [DK] Denmark .................................. 1313/93

[51] Int. Cl.⁶ .............................. A23G 1/00; B23Q 15/00
[52] U.S. Cl. .............................. 426/231; 99/348; 99/486; 426/519; 426/524; 426/660
[58] Field of Search ..................................... 426/231, 233, 426/519, 660, 524; 99/348, 486

[56] References Cited

U.S. PATENT DOCUMENTS 4,859,483  8/1989  Sollich ..................... 426/524

FOREIGN PATENT DOCUMENTS

0472886A1  3/1992  European Pat. Off. ..

*Primary Examiner*—George Yeung
*Attorney, Agent, or Firm*—Finnegan, Henderson, Farabow, Garrett & Dunner

[57] ABSTRACT

A method and an apparatus for continuous tempering of in particular a chocolate mass which passes through a cooling zone (A) having a final crystal formation area (K) and a subsequent reheating zone (G). The cooling medium flow, which overflows the crystal formation area (K), is controlled in response to measured values of the temperature of the chocolate mass at the crystal formation area. This ensures that the heat energy transport from the chocolate mass is continuously adapted to the instantaneous requirement, irrespective of the inlet temperature of the mass and the flowing chocolate mass amount per unit of time. It is hereby surprisingly possible to make a tempered chocolate mass having a predetermined constant content of stable beta crystals.

14 Claims, 2 Drawing Sheets

5,525,364

METHOD AND AN APPARATUS FOR TEMPERING CHOCOLATE-LIKE MASSES

FIELD OF THE INVENTION

The invention concerns a method of continuously tempering a flowing cocoa butter or other fat containing chocolate-like mass which passes through a cooling zone having a plurality of cooling surfaces and a subsequent reheating zone having a plurality of heating surfaces for the chocolate mass, seen in the flow direction of said mass, said cooling surfaces being overflown by at least two separately circulating cooling media, one of which exclusively overflows a final crystal formation area for the chocolate mass in the cooling zone, said heating surfaces being overflown by at least one separately circulating heating medium.

The invention moreover concerns an apparatus for use in the performance of the method of the invention, said apparatus comprising a cooling zone having a plurality of cooling surfaces and a subsequent reheating zone having a plurality of heating surfaces for the chocolate mass, seen in the flow direction of said mass, said cooling surfaces being overflown by cooling medium which flows in its respective one of at least two separately circulating cooling circuits, and the cooling medium in one cooling circuit comprising separate pumping means exclusively overflows a final crystal formation area for the chocolate mass in the cooling zone, said heating surfaces being overflown by heating medium which flows in at least one separately circulating heating circuit, each of said separately circulating cooling and heating circuits comprising a heating member and a valve for controlling external cold medium supply to the circuit for controlled regulation of the cooling or heating medium temperature of the circuit concerned, said apparatus moreover comprising at least one temperature sensor which is arranged in the chocolate mass at the crystal formation area and is connected to an electronic control unit.

BACKGROUND OF THE INVENTION

The known tempering devices of the type mentioned above are built and dimensioned to obtain "optimum" tempering of the chocolate-like mass at nominal capacity, i.e. at a predetermined chocolate flow.

Large amounts of constantly flowing cooling and heating medium circulate in the separate cooling and heating circuits of the devices under stable operating conditions. Thus, the circulating cooling and heating medium amount is adapted to discharge and supply the necessary heat energy amount from and to the chocolate mass to achieve the desired temperature and thus presumed optimum state of the chocolate mass at a nominal capacity.

In other words, at the nominal capacity of the tempering apparatus the operation is optimum because the area of the cooling and heating surfaces is correct for the nominal chocolate flow. In other words, the heat energy discharge from or supply to the chocolate mass is optimum.

Therefore, the efforts have always been focussed on controlled regulation of the temperature of the cooling and heating medium for the circulation circuit concerned on the basis of the measured mass temperature at the outlet of the zone which is associated with the circulation circuit concerned.

When the known chocolate tempering devices are to work at a capacity which is not nominal, e.g. 50% of it, it is difficult to obtain optimum control of the apparatus and thus the desired state of the tempered chocolate mass, without having to perform manual control operations on the apparatus in operation. The reason is that the extent of the cooling and heating surfaces is much too great with respect to the flow of the chocolate mass, and the transport of heat energy to and from the chocolate mass is therefore difficult to control to the desired level.

In particular, it has been found difficult to control the heat energy transport in the crystal formation area of the apparatus, which is particularly critical because precisely the control of this area is of decisive importance for the state of the finish-tempered chocolate mass.

The state of the finish-tempered chocolate mass is predominantly determined by its final temperature and content of stable beta crystals. The desired final temperature is determined on the basis of preceding tests and empirical values of the composition of the constituent parts, such as the fat content, of the chocolate mass concerned. The content of stable beta crystals should always be around 5% when subsequent high quality characteristics of the moulded chocolate article are to be obtained, such as long shelf life, uniform appearance without dullness, good taste, etc., as is known in the chocolate making industry. The desired content of the stable beta crystals in the tempered chocolate mass can fluctuate slightly around the 5%, depending upon whether the chocolate mass is subsequently to be moulded or used for coating articles.

When the known tempering devices work at a lower capacity than the nominal one, at which they are designed to operate optimally, there will be an excessive cooling surface area (a too large cold spot) in the crystal formation area when, other things being equal, the temperature is the same as at the nominal capacity. There will hereby be an excessive heat energy transport from the chocolate mass, and too many crystals will undesirably be formed in it.

The only possibility of obtaining a better control is to raise the cooling water temperature, so that the heat energy transport from the chocolate mass is reduced. When the cooling water temperature is regulated in response to the measured chocolate temperature at the crystal formation area, the cooling water temperature will be increased automatically when the chocolate temperature decreases, which will be a consequence of an excessive heat energy transport away from it.

However, the formation of the most important beta crystals will not be initiated until the chocolate mass has been cooled to a predetermined temperature level, which, in the known tempering devices, has been found to correspond to a temperature of the cooling medium (cooling water) of about 16° C. Therefore, if the temperature of the cooling medium is too high, which is frequently the case with the controlled regulation in the known chocolate tempering devices, the crystal formation will not begin at all. It has therefore been found that it is difficult for the known chocolate tempering devices to work reliably in operation to achieve the desired content of stable beta crystals in the tempered chocolate mass, when working with a considerably lower capacity than the nominal capacity, e.g. about 50% of the nominal capacity.

EP-O 472 886 A1 discloses a method and a tempering device in which the flow amount and/or temperature of the cooling medium in one or more of the initial zones is controlled by means of a control unit which measures the temperature of the chocolate mass at the end of the crystal formation area. However, the control is a kind of feedback control which, as found by a skilled person, has a very long reaction time before "equilibrium" is obtained again and the desired temperature of the chocolate mass has been reached before it passes into the crystal formation area. The document only contains teachings with respect to maintaining a constant cooling medium temperature at the crystal formation area. The document provides no teachings on how to achieve a separately controlled regulation of the heat energy transport in the crystal formation zone which is very important for the beta crystal formation.

SUMMARY OF THE INVENTION

The object of the present invention is therefore to provide a method and a device for continuous tempering of chocolate-like masses, where the content of stable beta crystals in the finish-tempered mass constitutes a predetermined portion of the total amount of the tempered mass.

The method of the present invention is characterized in that the flow of the separately circulating cooling medium, which overflows the final crystal formation area, is controlled in response to measured values of the chocolate mass temperature at the crystal formation area.

The apparatus of the present invention is characterized in that the electronic control unit is connected to the pumping means in the cooling circuit, whose cooling medium overflows the crystal formation area, and that the control unit is adapted to control the flow in response to the received measured values of the chocolate mass temperature at the crystal formation area.

Accordingly, a method and an apparatus are provided for continuous tempering of chocolate-like masses, making it possible to control the contained amount of the desired stable beta crystals to a predetermined constant portion of the total amount of the tempered mass, independently of the flowing tempered mass amount per unit of time and its inlet temperature. Thus, a tempered chocolate-like mass, always ensuring that e.g. chocolate articles having the desired quality characteristics can subsequently be made, is provided with certainty; and in particular the tempered mass with its predetermined, constant content of stable beta crystals makes it particularly suitable for the subsequent use for which it is contemplated.

The flow control may be provided in practice by using a pump with a directly controllable pump flow, or by a combination of a pump and a subsequent electronically adjustable three-way valve with bypass which is adapted to control the flow.

In the operation of the tempering apparatus the size of the extent of the crystallization surface in the crystal formation zone and thereby the heat energy transport from the mass is continuously adapted to the instantaneous requirement, irrespective of the inlet temperature of the mass and flowing mass amount per unit of time, by controlled regulation of the cooling medium flow in the crystal formation area. The temperature of the crystal-containing mass is measured continuously and is used as a control parameter for the continuous regulation of the cooling water flow and thus the adaptation of the heat energy transport to the instantaneous requirement.

BRIEF DESCRIPTION OF THE DRAWINGS

The invention will be explained more fully below with reference to a particularly preferred embodiment as well as the drawing, in which FIG. 1 schematically shows a chocolate tempering apparatus in vertical axial section and a diagram of the associated cooling and heating circuits and associated electronic control units.

DESCRIPTION OF A PREFERRED EMBODIMENT OF THE INVENTION

Figure 1:
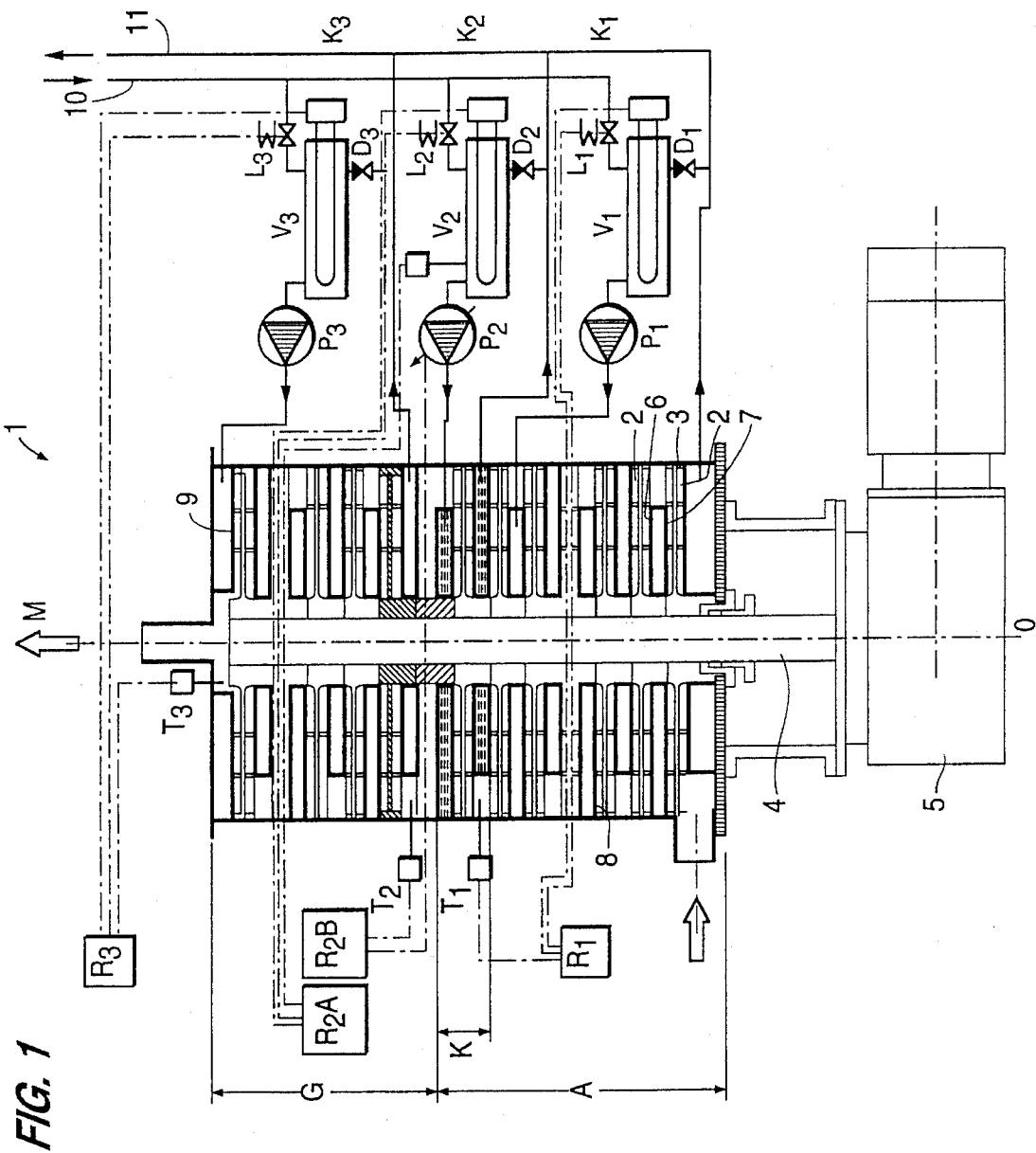

The chocolate tempering apparatus 1 shown in FIG. 1 comprises a plurality of separate treatment sections 2 which are arranged on top of each other and are interconnected, and through which the chocolate mass flows in a horizontal direction under the action of stirring and mixing blades 3. The stirring blades 3 are rotated by means of a vertical through shaft 4 which is driven by a motor 5.

The treatment sections 2 are separated by intermediate heat transport sections 6 through which water flows with a view to adding or removing heat from the chocolate mass through partitions 7 between heat transport sections 6 and adjacent treatment sections 2.

The treatment sections 2 and intermediate heat transport sections 6 of the chocolate tempering apparatus 1 constitute a cooling zone A having a plurality of cooling surfaces 8 and a subsequent reheating zone G having a plurality of heating surfaces 9 for the chocolate mass seen in the flow direction of said mass. The cooling surfaces 8 and the heating surfaces 9 are comprised by said partitions 7.

The cooling surfaces 8 are overflown by cooling water which flows in two separately circulating cooling circuits K1 and K2. The cooling water in one cooling circuit K2 exclusively overflows cooling surfaces 8 in a final crystal formation area K for the chocolate mass in the cooling zone A.

The heating surfaces 9 are overflown by hot water which flows in a separately circulating heating circuit K3. The separately circulating cooling and heating circuits K1, K2 and K3, respectively, comprise a heating member V1, V2 and V3, respectively, and a valve L1, L2 and L3, respectively, for controlling the external cold water supply to the circuit concerned via an inlet conduit 10 for controlled regulation of the cold or hot water temperature of the circuit concerned.

Each of the circuits K1, K2 and K3, respectively, also comprises a secondary valve D1, D2 and D3, respectively, for controlling the circulating cold water amount or hot water amount with respect to the amount which is optionally discharged via an outlet conduit 11.

Figure 3:
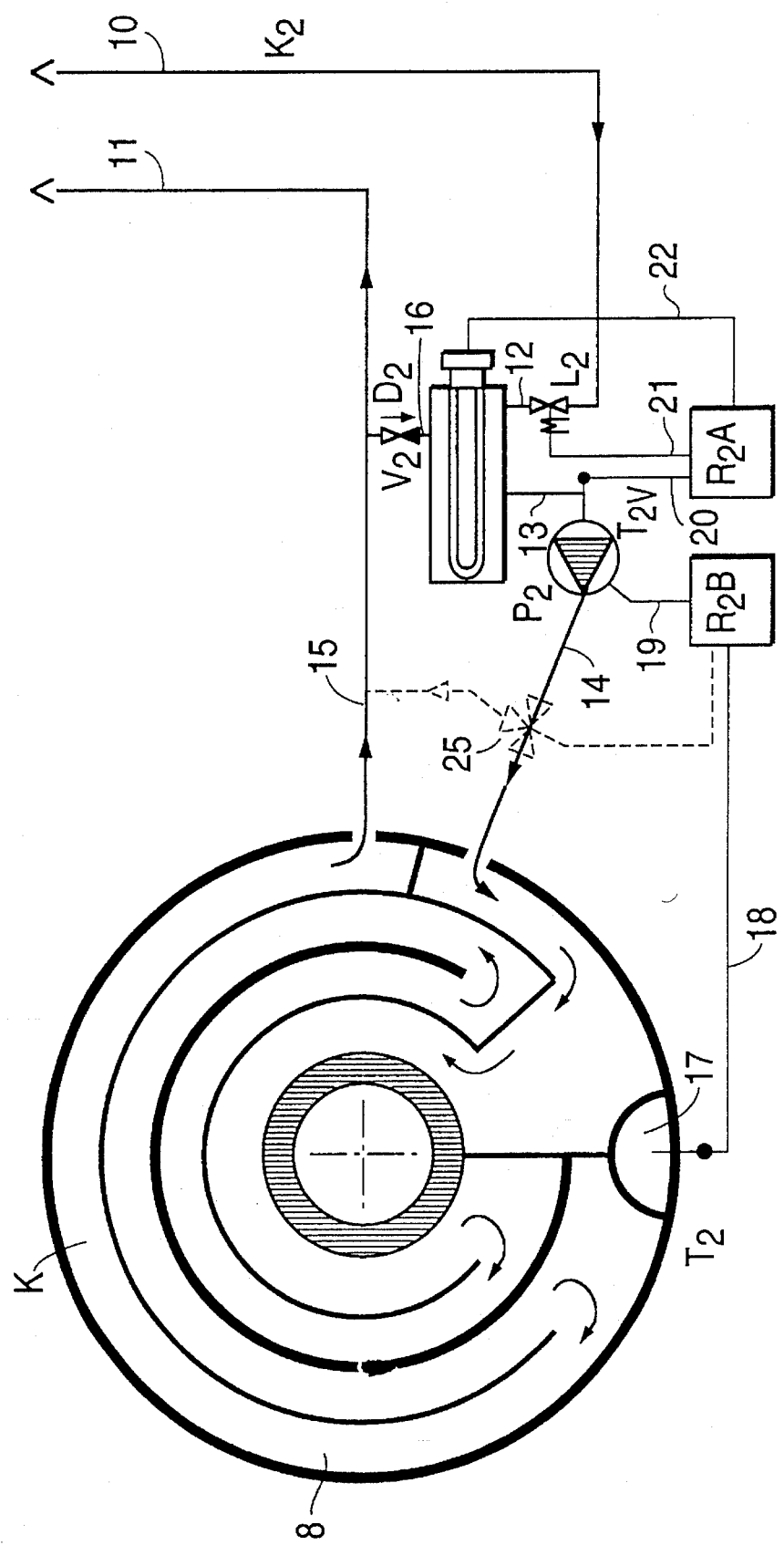
FIG. 3 shows a cross-section from above through the cooling water ducts of the crystal formation area and a diagram of the associated cooling circuit.

The simplified structure of the cooling circuit K2 is shown in greater detail in FIG. 3. It appears from this figure that the inlet conduit 10 is connected with the valve L2, which is connected with the heating member V2 by a conduit 12. The heating member V2 is connected via a conduit 13 with the pump P2, which is connected via a conduit 14 with two successive heat transport sections 6, which, in the shown embodiment, constitute the crystal formation area K for the admission of cooling water to these. For the discharge of the circulating cooling water, a conduit 15 extends away from the heat transport sections and is connected with the heating member V2 via a branch 16 having a valve D2 before the conduit 15 merges into the outlet conduit 11.

As shown in FIG. 1, temperature sensors T1, T2 and T3 are arranged in the chocolate mass for measuring the chocolate mass temperature t1, t2 and t3 at the initial part of the cooling zone A, the crystal formation area K and the reheating zone G. As shown in FIG. 3, the temperature sensors T1, T2 and T3 can preferably be arranged in communication openings 17 through which the chocolate mass flows from one treatment section to the next one. The temperature sensors are preferably arranged in the vicinity of the termination of the zone concerned.

The temperature sensors T1 and T3, respectively, are wired in a known manner to an electronic control unit R1 and R3, respectively, which is wired to the heating member V1 and V3, respectively, and the valve L1 and L3, respectively of the cooling circuit concerned K1 and K3, respectively. The electronic control units R1 and R3 are adapted to control the temperatures of the cooling water and the hot water, respectively, in the circuit concerned K1 or K3 in response to pre-entered temperature values to provide the desired chocolate temperature t1 and t3, respectively.

As shown in FIG. 3, the temperature sensor T2 is connected via a wire 18 to an electronic control unit R2B, which is connected via a wire 19 to the pump P2 of the cooling circuit K2. The control unit R2B is adapted to control the pump flow in response to the received measured values of the chocolate mass temperature $t_2$ at the crystal formation area K.

The pump flow may e.g. be frequency-controlled in response to the measured chocolate mass temperature.

As an alternative to the electronically controlled pump flow, the control may also be performed by mounting a corresponding electronically controlled three-way valve 25 with bypass, as shown in broken line in FIG. 3. The pump can hereby operate with a constant flow, while the controlled flow of cooling medium at the crystal formation area is regulated by the control of the three-way valve.

A further electronic control unit $R_2 A$, which, however, may be incorporated in the control unit $R_2 B$, is connected via a wire 20 to a temperature sensor $T2_v$ which is arranged in the cooling water in the cooling circuit K2. The electronic control unit $R_2 A$ is connected via a wire 21 to the valve L2 and via a wire 22 to the heating member V2. The electronic control unit $R_2 A$ is adapted to control the heat emission of the heating member V2 and the open/close state of the valve L2 in response to the received measured values of the cooling water temperature. The cooling water temperature is controlled to a constant level in response to predetermined, received temperature values.

It has extremely surprisingly been found in the operation of the chocolate tempering apparatus that the size of the extent of the crystallization surface in the crystal formation zone K is continuously adapted to the instantaneous requirement, irrespective of the inlet temperature of the chocolate mass and the flowing mass amount per unit of time, by the controlled regulation of the cooling medium flow in the crystal formation zone K.

It is hereby ensured that the cooling water temperature can be kept sufficiently low about 15°–17° C., so that it is always certain that the formation of the important beta crystals begins irrespective of the flowing chocolate mass amount per unit of time. The temperatures $t_1$ and $t_2$ of the chocolate mass depend on the chocolate type concerned which is tempered. However, $t_2$ will frequently be about 1°–3° C. lower than $t_1$, always provided however that $t_2$ is set sufficiently low for the crystal formation to begin in the mass. The controlled regulation of the pump flow ensures the correct heat energy transport from the chocolate mass in the crystal formation zone K in response to the continuous regulation of the cooling water flow, the temperature $t_2$ of the crystal-containing mass being measured continuously and being used as a control parameter. It is hereby ensured that the chocolate mass can be tempered to a controlled content of the stable beta crystals, which is frequently about 5%.

Figure 2:
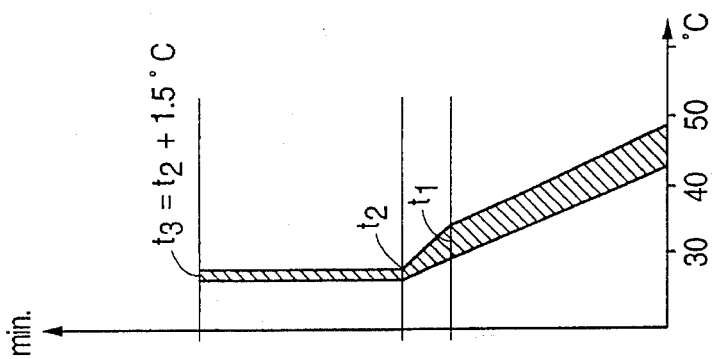
FIG. 2 shows a diagram of the chocolate mass temperature during the flow of the mass through the tempering apparatus.

During the passage of the crystal-containing chocolate mass through the treatment sections in the reheating zone G, the mass is heated to a temperature $t_3$ which is preferably set to be 1.5° C. higher than the crystal formation temperature $t_2$, as shown in FIG. 2. The finish-tempered chocolate mass then leaves the apparatus for subsequent use, e.g. for moulding as chocolate articles.

I claim:

1. A method of continuously tempering a mass of flowing cocoa butter or similar fat-containing chocolate, which mass first passes through a cooling zone having a plurality of cooling surfaces and then a subsequent reheating zone having a plurality of heating surfaces for the mass, said cooling surfaces being overflown by at least two separately circulating cooling media, one of which exclusively overflows a final crystal formation area for the mass in the cooling zone, said heating surfaces being overflown by at least one separately circulating heating medium, which method comprises measuring the temperature of the mass at the crystal formation area and controlling the flow of the separately circulating cooling medium which overflows the final crystal formation area in response to measured values of the temperature of the mass at the crystal formation area.

2. A method according to claim 1, wherein the temperature of the separately circulating cooling medium which overflows the final crystal formation area is controlled to a constant level in accordance with predetermined temperature values.

3. A method according to claim 1 or 2, wherein the temperature of at least one of the separately circulating cooling and heating media is controlled in response to measured values of the temperature of the mass at the cooling and heating surfaces which are overflown by the medium concerned.

4. A method according to claim 3, wherein the temperature of the cooling and heating media is controlled in accordance with predetermined temperature values of the mass.

5. An apparatus for the continuous tempering of a mass of flowing cocoa butter or similar fat containing chocolate, comprising a cooling zone having a plurality of cooling surfaces followed by a subsequent reheating zone having a plurality of heating surfaces for the mass, at least two separately circulating cooling circuits, each for flowing cooling medium over one of said cooling surfaces, said cooling medium in one cooling circuit, which comprises separate pumping means, exclusively overflowing cooling surfaces in a final crystal formation area for the mass in the cooling zone, at least one separately circulating heating circuit for flowing heating medium over said heating surfaces, each of said separately circulating cooling and heating circuits comprising a heating member and a valve for controlling external cold medium supply to the circuit for controlled regulation of the cooling or heating medium temperature, said apparatus further comprising at least a first temperature sensor which is arranged in the mass at the crystal formation area and is connected to an electronic control unit which receives measured values of the mass temperature from the first temperature sensor, wherein the electronic control unit is connected to the pumping means in the cooling circuit whose cooling medium overflows the crystal formation area, and the control unit controls the cooling medium flow in response to the received, measured values of the mass temperature at the crystal formation area.

6. An apparatus according to claim 5, wherein the pumping means comprise an electronically controlled valve means, including an electronically controlled three-way valve with bypass, which controls the cooling medium flow.

7. An apparatus according to claim 5, wherein the apparatus further comprises a second temperature sensor arranged in the cooling medium of the cooling circuit which overflows the crystal formation area (K).

8. An apparatus according to claim 7, wherein a heating member, an external cold medium supply control valve, and said second temperature sensor are all in the cooling circuit whose cooling medium overflows the crystal formation area, and are connected to a second electronic control unit which controls the heat emission of the heating member and the open/close state of the valve in response to the received, measured values of the cooling medium temperature from the second temperature sensor.

9. An apparatus according to claim 8, wherein the second electronic control unit controls the temperature of the cooling medium to a constant level in response to predetermined, entered temperature values.

10. An apparatus according to claim 8, wherein the second control unit is comprised of the first electronic control unit which controls the pump flow.

11. An apparatus according to claim 5, wherein the apparatus comprises additional temperature sensors which are arranged in the mass at other cooling and heating surfaces and are connected to additional electronic control units, which are connected to the heating member and cold medium supply control valve of the associated cooling and heating circuits, and which control the heat emission of the heating member and the open/close state of the valve in response to received, measured values of the mass temperature.

12. An apparatus according to claim 11, wherein said additional control units control the temperature of the cooling medium and the heating medium in accordance with predetermined, entered temperature values of the mass.

13. An apparatus according to claim 5, further including a plurality of separate treatment sections which are arranged on top of each other and are interconnected, and through which the mass flows in substantially horizontal direction under the action of stirring blades which rotate about a central axis through the apparatus, said treatment sections being separated by intermediate heat transport sections through which a liquid flows to add or remove heat from the mass through partitions between heat transport sections and adjacent treatment sections, said cooling and heating surfaces being comprised of said partitions, and wherein the crystal formation area comprises the cooling surfaces in at least one treatment section.

14. An apparatus according to claim 13, wherein the crystal formation area comprise the cooling surfaces in two successive treatment sections, and the temperature sensor of the crystal formation area is positioned in a communication opening between the two successive treatment sections.

* * * * *